Figure 1:
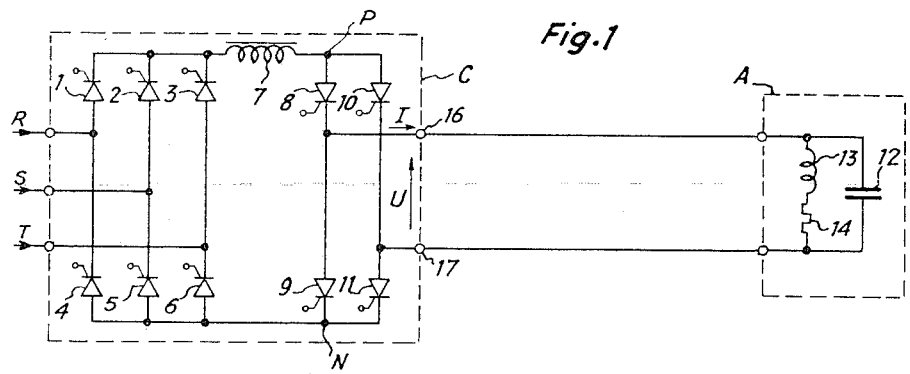

United States Patent [19]
Caussin

[11] 3,800,210
[45] Mar. 26, 1974

[54] SYSTEM FOR THE ELECTRIC SUPPLY OF A VARIABLE CAPACITIVE LOAD

[75] Inventor: Georges Caussin, Montigny-sur-Loing, France

[73] Assignees: Jeumont-Schneider, Paris (Seine); Trailigaz, Garges-Les-Gonesse (Val d'Oise), both of France

[22] Filed: Mar. 15, 1972

[21] Appl. No.: 234,886

[30] Foreign Application Priority Data
Mar. 16, 1971 France............................ 71.09049

[52] U.S. Cl............... 321/9 R, 250/532, 250/535, 321/4, 321/45 R, 333/77
[51] Int. Cl..... H02m 7/42, C01b 13/12, H01h 7/08
[58] Field of Search......... 321/4, 45 R, 9 R; 333/77; 204/176; 250/532, 535, 536

[56] References Cited
UNITED STATES PATENTS

| | | | |
|---|---|---|---|
| 3,496,092 | 2/1970 | Fraser | 204/313 X |
| 3,483,462 | 12/1969 | Bedford | 321/45 R |
| 3,551,632 | 12/1970 | Geisel | 321/4 |
| 3,341,737 | 9/1967 | Rosa | 321/4 X |
| 2,524,821 | 10/1950 | Montgomery | 333/77 X |
| 3,453,522 | 7/1969 | Ausfeld | 321/4 |

FOREIGN PATENTS OR APPLICATIONS

| | | | |
|---|---|---|---|
| 1,533,302 | 6/1968 | France | 204/317 |
| 1,204,692 | 9/1970 | Great Britain | 321/45 R |

*Primary Examiner*—William H. Beha, Jr.
*Attorney, Agent, or Firm*—Raymond A. Robic; Arthur Schwartz

[57] ABSTRACT

System for the electric supply of a variable capacitive load by means, for each of the phases of the load, of an independent inverter comprising controlled rectifiers such as thyristors, which is connected by its input terminals to a direct-current source, which may be a rectifier, and by its output terminals to the terminals of a matching network whose output terminals are connected to the load. The matching network is formed of a capacitor connected to the input terminals of the matching network, a transformer having a high magnetising current, a filtering circuit comprising two inductances of which one is connected in parallel with the same terminals as those of the capacitor and the other in series in the circuit connecting one terminal of the capacitor to the corresponding terminal of the primary winding of the transformer. The terminals of the secondary winding of the transformer are connected to the terminals of the load.

3 Claims, 11 Drawing Figures

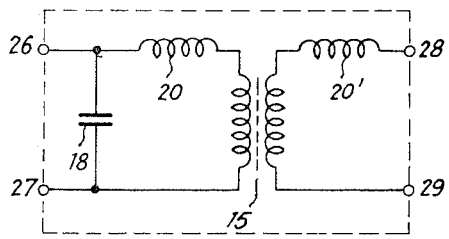
Fig.4
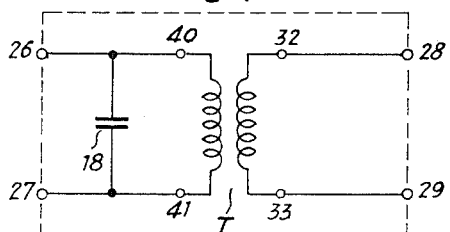
Fig.6
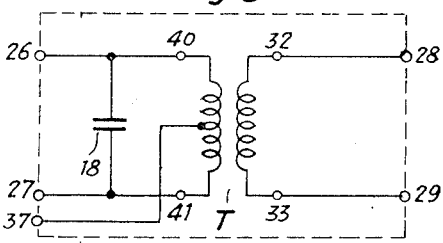
Fig.7
Fig.8
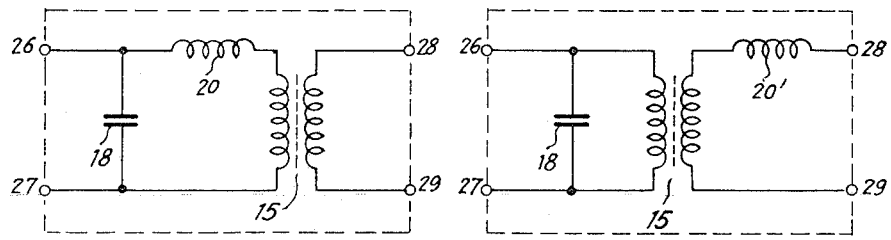
Fig.5
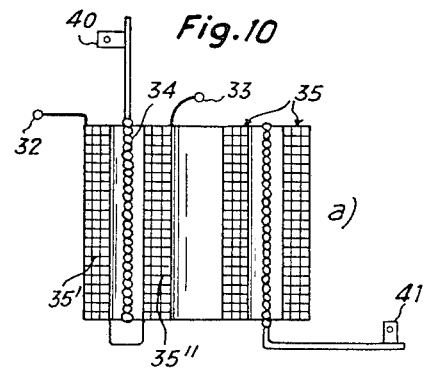
Fig.10
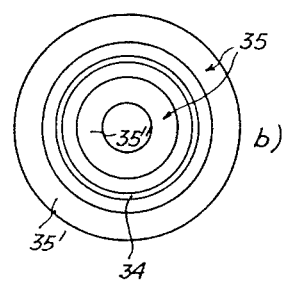

SYSTEM FOR THE ELECTRIC SUPPLY OF A VARIABLE CAPACITIVE LOAD

The present invention concerns a system for the electric supply of a variable capacitive load by means — for each of the phases of the load — of an independent "parallel" inverter comprising controlled rectifier elements, such as thyristors, which is connected by its input terminals to a direct-current source — which may be a rectifier — and by its output terminals to the terminals of a matching network whose output terminals are connected to the load.

This system is applicable more particularly to the supply of an ozoniser. It is known that the power absorbed by an ozoniser at a given voltage is proportional to the supply frequency. The production of ozone is non-proportionally related to the power absorbed and experience shows that, with a given ozoniser, the production of ozone is maximum for a certain value of the frequency, which is always distinctly higher than the frequencies of industrial networks.

In addition, the duration of the discharge in relation to the duration of the period of the alternating current applied to the ozoniser plays an important part in the efficiency of the production of ozone. In proportion as the relative duration of the discharge is shorter, the time during which the ozone formed is not subject to the destructive thermal effect is longer, and the effectiveness of the discharge in the generation of ozone will be accordingly increased. The relative duration of the discharge can be indfluenced by applying to the ozoniser a voltage and a current of appropriate form, containing certain appropriately chosen harmonics.

In order to effect single-phase supply to the ozoniser at medium frequency, while avoiding the known use of a rotary converter, which has various disadvantages, a static converter is employed in the present invention, in which the system for the electric supply to the ozoniser consists of the association of a coupling circuit of novel type — designed with a view to the production of current harmonics which are favourable to the production of ozone and with a view to protection against the internal defects of the ozoniser — with, on the one hand, a static converter known per se which forms an electric medium-frequency source, and on the other hand an ozoniser known per se.

The system according to the invention is characterized in that the matching network is formed of a capacitor connected to the input terminals of the said network, a filtering cell comprising two inductances, of which one is connected in parallel with the same terminals as those of the capacitor and the other is in series in the circuit connecting the phase terminal of the capacitor to the corresponding terminal of the primary winding of the transformer referred to in the following, and a transformer having a high magnetising current, in which the terminals of the secondary winding are connected to the terminals of the ($a$) phase of the load.

Figure 2:
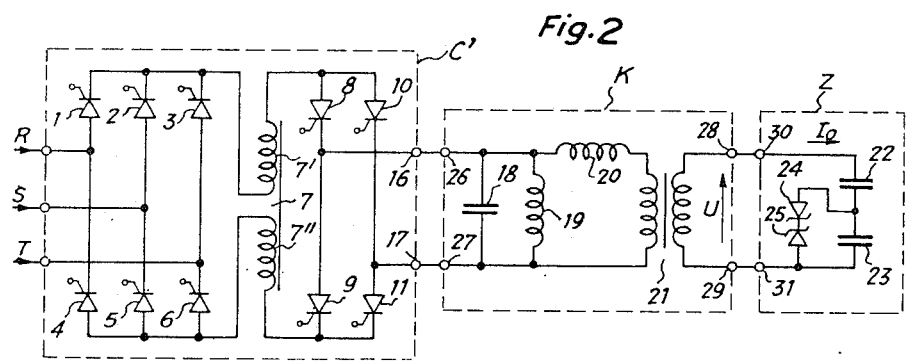
Figure 9:
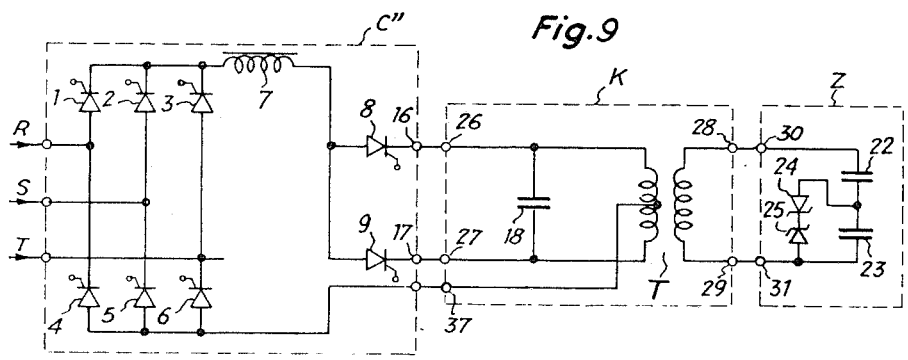
Figure 3:
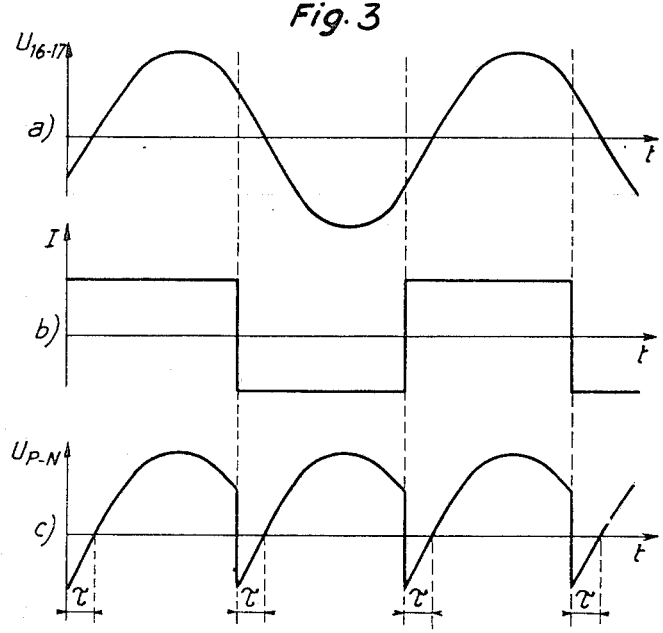
Figure 11:
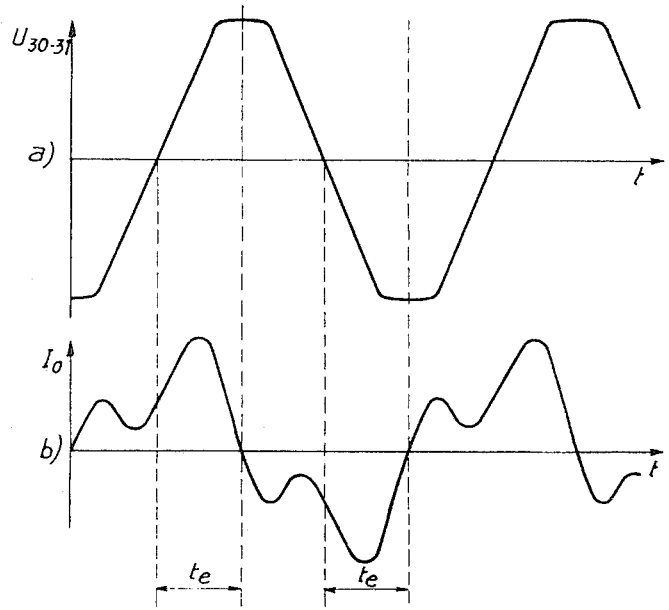

The invention will be more readily understood with the aid of a particular example of an embodiment of an ozoniser, and of the accompanying drawings, in which:

FIG. 1 is a circuit diagram of a known static converter supplying any load,

FIG. 2 is the electric circuit diagram of a supply system according to the invention for an ozoniser, FIG. 3 illustrates the curve forms of the voltages and currents at various points of the circuit of FIG. 2, FIGS. 4 to 8 illustrate variants of the coupling circuit of FIG. 2, FIG. 9 is a variant of the diagram of FIG. 2, FIG. 10 illustrates the special transformer employed in the invention, and FIG. 11 illustrates the curve form of the voltages and currents at the input of the ozoniser.

The circuit diagram of a known static converter comprising thyristors is shown in FIG. 1. The converter C comprises inputs RST, to which there are connected the phases of the industrial-frequency three-phase network; a rectifier comprising thyristors 1 to 6; a filtering inductance 7 intended to smooth the current supplied to the inverter referred to in the following; an inverter comprising thyristors 8 to 11; control and regulating circuits, which have been omitted from the figure for the sake of clarity; an output (terminals 16 and 17) to which the load circuit is connected.

The load circuit A is in general formed of a resistor 14, an inductance 13 and a capacitor 12. In this circuit, the capacitor 12 is intended to effect, on the one hand, the compensation of the reactive energy absorbed by the inductance 13, and on the other hand the supply of the additional reactive energy so as to bring about the commutation of the thyristors 8 to 11 of the inverter.

FIGS. 1 and 2 a so-called "bridge" arrangement, but a so-called "mid-point" arrangement, such as that illustrated in FIG. 9, may alternatively be employed.

The curve forms of the voltages U at various points of the circuit are shown in FIG. 3, as well as the curve form of the current I supplied by the converter. More particularly, the voltage between the points P and N, i.e., at the input of the inverter, is shown in FIG. 3 ($c$). This voltage is negative during a time $\tau$ which renders possible the turning-off either of the thyristors 8 and 11 when 9 and 10 are fired, or of the thyristors 9 and 10 when 8 and 11 are fired, because it is known that controlled rectifiers, of the mercury vapour type or of the type comprising semiconductor elements, require a certain rest time $t_4$ r they can again be subjected to a positive voltage. The time $\tau$ may be greater than $t_r$, and in order that this may be so, the load circuit may have a capacitive nature so as to cause the current I passing through the load circuit to lead the voltage U 16–17. In addition, the load circuit must be oscillating and its damping must not be too great to prevent the inverter from operating. Finally, since the current I supplied by the converter is substantially rectangular, the capacitor 12 must be disposed between the terminals 16–17 in order to absorb the rapid alternations of the current without overvoltages.

If the natural frequency formed by 12, 13, 14 is designated $f_o$, the frequency $f$ at which the thyristors 8,9 and 10,11 will be controlled must be higher than $f_o$. Such a converter is sometimes referred to as a "parallel-inverter" converter.

In order that this converter may be employed for supplying an ozoniser, it is desirable to connect between the said converter and the said ozoniser an appropriate coupling circuit K, which constitutes one of the objects of the invention, and which conforms to the following characteristics:

a. it is capacitive, has at least a characteristic frequency $f_o$ and permits correct operation of the inverter, that is to say, it allows the passage, without appreciable overvoltage, of a substantially rectangular current (which is in fact slightly trapezoidal owing to the practical circuit arrangement of the inverter), b. it generates certain current and voltage harmonics, so as to improve the production of ozone by reduction of the discharge duration, and c. in the case of an internal defect in the ozoniser, it limits the fault current to an acceptable value in order to avoid damage to the ozoniser, before the usual protective devices have had time to operate.

FIG. 2 shows a first embodiment of the invention. There will be seen therein the converter C' similar to the previously described converter C, but with a constructional variant of the filtering inductance 7 which is subdivided into two parts 7',7''; the coupling circuit K and the ozoniser Z, represented by its equivalent electric circuit diagram, namely a capacitor 22 in series with another capacitor 23 which is in turn shunted by two Zener diodes 24 and 25 in opposition.

In order to satisfy the criteria mentioned in the foregoing, the coupling circuit K is composed on the one hand of a four-terminal network of τ-form which consists of the capacitor 18 and of the inductance 19, which are connected in parallel to the terminals 26 and 27, and on the other hand of the inductance 20 and the primary winding of a step-up transformer 21, which are connected in series in the circuit extending from the terminal 27. This is, in fact, a particular circuit arrangement of parallel-series mode, followed by a transformer. The output of the coupling circuit K passes through the terminals 28 and 29, which are directly connected to the terminals 30 and 31 of the ozoniser Z.

The capacitor 18 prevents any overvoltage in the inversions of the current, whether rectangular or slightly trapezoidal, emanating from the converter in the coupling circuit K and constitutes with the inductance 19 an oscillation circuit permitting correct operation of the inverter.

The inductance 20 associated with the non-linear load of the ozonizer Z through a step-up transformer 21 generates voltage and current harmonics which are favourable to the good production of ozone, and if the said inductance 20 is of correct value, it limits to an acceptable value the discharge current of the capacitor 18 in the event of an internal defect in the ozoniser, such as a short-circuit.

FIGS. 4 to 8 show other forms of construction of the coupling circuit K according to the invention, all of which are of the parallel-series mode, which is characteristic of the invention, and are deduced from the example given in FIG. 2. In FIG. 4, the inductance 19 is replaced by a transformer 15 having one or more air gaps, which has a relatively high magnetising current. In FIG. 5, there is employed a transformer 15 having one or more air gaps and an inductance 20' connected to the secondary winding of the said transformer. In FIG. 6, inductances 20 and 20' are provided respectively on the primary side and on the secondary side of the air-gap transformer 15. FIG. 7 illustrates the preferred embodiment of the invention. In FIG. 8, a centre tap is provided on the primary winding of the transformer T and led to the terminal 37, and it then becomes possible to use a simpler inverter of the "midpoint" type C, as illustrated in FIG. 9.

In the construction according to FIG. 7, the inductances 19 and 20 of FIG. 2 are replaced by a special transformer T formed as indicated in FIG. 10 of a primary winding 34 (terminals 40, 41), advantageously designed in the form of a winding comprising one or more hollow conductors to permit the passage of a cooling fluid, and a secondary winding 35 (terminals 32, 33) which is preferably, but not necessarily, constructed in biconcentric form (35',35'').

In accordance with one feature of the invention, the said transformer T has no magnetic circuit formed of sheet-metal stampings or other magnetic materials. It is to be noted that, from the electrical viewpoint, the construction according to FIG. 7, is strictly identical to those of FIGS. 4 and 5. Let $L_p$ be the inherent inductance of the winding 34, $L_s$ the inherent inductance of the winding 35, and M the mutual inductance existing between the two winding 34 and 35: the inductance 20 of FIG. 4 would have the value $L_p - M^2/L_s$ in FIG. 7 and the inductance 20' of FIG. 5 would have the value $L_s - M^2/L_p$ in FIG. 7.

FIG. 11 shows by way of example the curve form of the current $I_0$ and of the voltage at the input of the ozoniser (terminals 30,31) with the use of the coupling circuit K described. It will be noted that the discharge duration $t_e$ is equal to a quarter-cycle, but this is only an example, and different discharge durations, which may be short, may be obtained by appropriate choice of the characteristics of the elements of the coupling circuit K.

I claim:

1. System for the electric supply of a variable capacitive load comprising:
    a. a load-guided, parallel inverter connected at its input terminals to a direct-current source and at its output terminals to a plurality of terminals of a matching network,
    b. said matching network having a pair of output terminals, said matching network output terminals being connected to the load,
    c. said matching network including
        1. a capacitor having a pair of terminals connected to said matching network input terminals
        2. a transformer with primary and secondary windings having a high magnetizing current, and
        3. a filtering circuit comprising two inductances,
    d. wherein one of said inductances is connected in parallel with the matching network terminals to which said capacitor is connected, and the other inductance is connected in series in the circuit connecting one of said terminals of the capacitor to the corresponding terminal of said primary winding of the transformer, and the terminals of said secondary winding of the transformer being connected to the terminals of the load.

2. A system as defined in claim 1 wherein said load is an ozonizer.

3. A system as defined in claim 1 wherein said inverter is of the bridge type.

* * * * *